June 6, 1950  R. H. SHEPPARD  2,510,484
CYLINDER HEAD
Filed Aug. 26, 1946  2 Sheets-Sheet 2
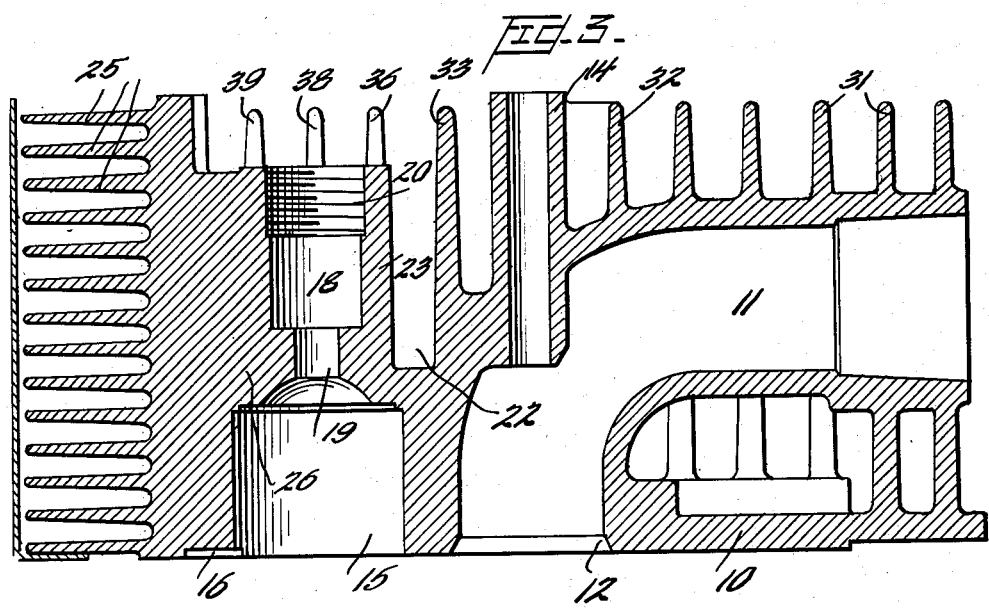
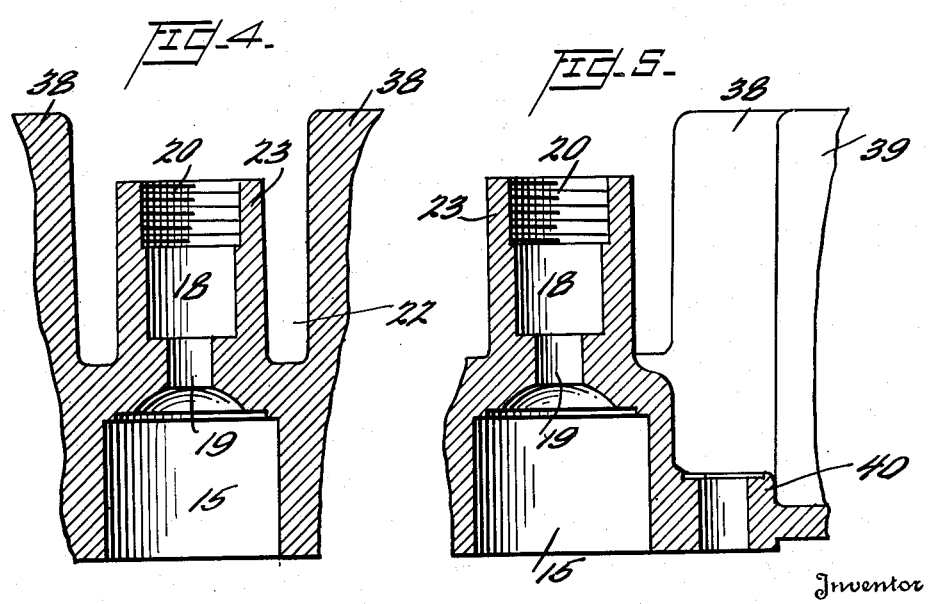
Inventor
Richard H. Sheppard,
By Henry H. Snelling
Attorney Patented June 6, 1950

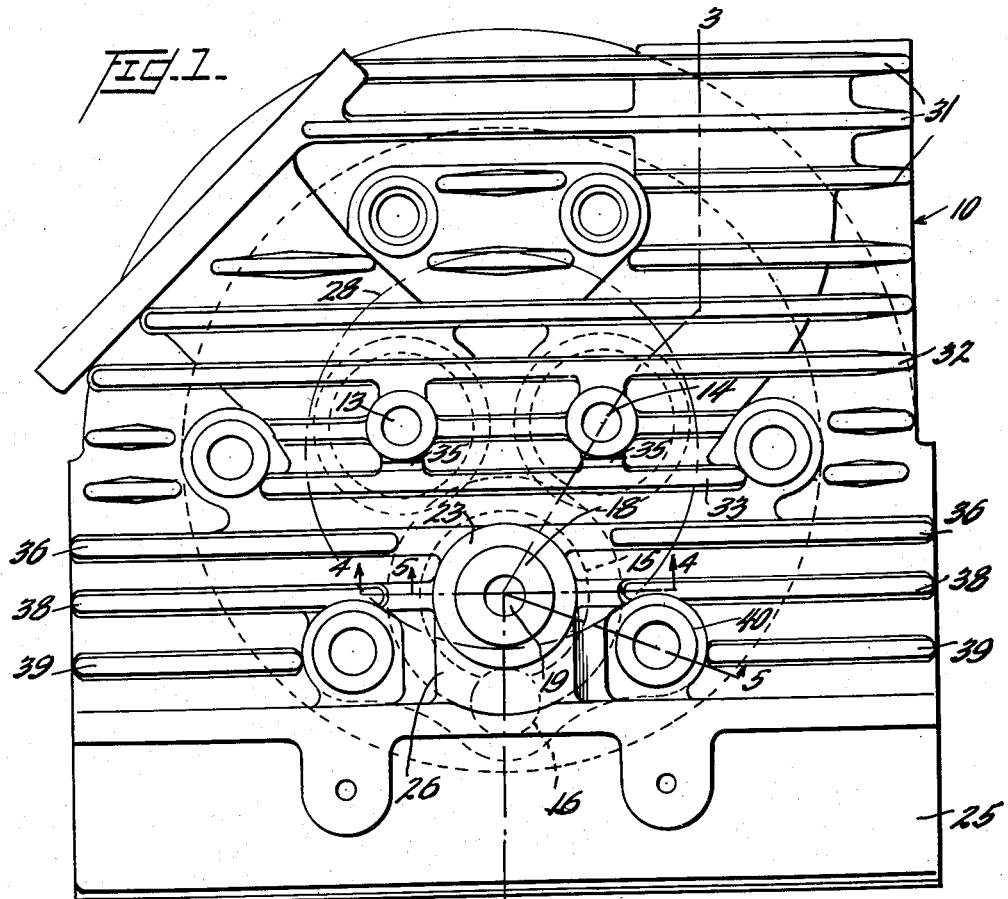

2,510,484

UNITED STATES PATENT OFFICE 2,510,484

CYLINDER HEAD

Richard H. Sheppard, Hanover, Pa.

Application August 26, 1946, Serial No. 693,008

8 Claims. (Cl. 123—193)

This invention relates to the cooling of combustion chamber inserts in Diesel engines and has for its principal object the formation of a bridge of solid metal on one side of the center line of the injection and combustion chamber and the adjacent fins.

In these engines it has been the practice to have a recess entirely surrounding the injector. This has been found unsatisfactory and the combustion chamber insert, which is the hottest part of the engine, has been found to overheat. By building the solid bridge of metal and by spacing the fins very close together, as for example ¼" from center to center, the heat from the combustion chamber insert is efficiently carried away. The rapidity of the carrying away of the heat may be increased materially by providing a thin sheet of steel baffle along one side of the horizontal fins, so that air from the cooling fan may be directed across the entire tier of fins, this cooling air which passes upwardly from the fan being directed substantially horizontally on the side of the cylinder head opposite the intake and exhaust ports and therefore being free to discharge to the atmosphere.

In the drawings:

Figure 1 is a top plan view of a cylinder head and body of my invention.

Figure 2 is a side elevation.

Figure 3 is a section taken on line 3—3 of Figure 1.

Figure 4 is a fragmentary section taken on line 4—4 of Figure 1.

Figure 5 is a fragmentary section taken on line 5—5 of Figure 1.

Referring first to Figure 3, the cylinder head as a whole is numbered 10. The passageway 11 is in the exhaust pipe having the usual seat 12 for the exhaust valve and the guide 14 for the exhaust valve stem. The recess 15 at the left accommodates a combustion chamber insert which is secured in accurate location by a disk fitting in the shallow circular recess 16. The injector fits in the space 18 and projects in the usual fashion through the throat 19 leading to the combustion chamber. The space 18 is threaded in the usual fashion as at 20 to secure the injector which may be of any desired type.

A deep recess or well 22 surrounds the post 23 which has centrally in it the cylindrical space 18 for the injector but this well is extended only through a bit more than three-quarters of the periphery of the post 23 and leaves a solid metal bridge 26 between the injector hole 18 and the auxiliary bank of fins 25.

As will be seen from Figure 1, the solid metal bridge is as wide from side to side as the diameter of the combustion chamber insert which it is to cool, and this bridge extends from about the top of the post 23 all the way down to the bottom of the cylinder head 10, as it conducts heat from the combustion chamber to the second or auxiliary bank of fins 25. The margin of the cylinder in the engine block below the head 10 is indicated by the dot and dash line 28.

The entire top of the cylinder head is provided with a main bank of fins, the fins 25 being considered as the second or auxiliary bank. The fins 31 along the exhaust passage 11 follow general practice, but I find it convenient to cast the fins 32 and 33 integral with the valve stem guides 13 and 14, and then afterward drill holes such as 34 or saw the connecting metal through, as indicated by numeral 35 to provide free passage of air in the direction of the length of the major bank of fins.

The fin 36 stops short on both sides of the injector post 23 to provide the well 22, but the fin 38 of the same bank is integral in part with the injector post, the better to carry away the heat from the top portion. The fins 39 stop short of the injector post, and in fact extend only to the bolt bosses 40. While the carrying away of heat in the direction of the major fins is thus sacrificed by the provision of the bridge 26, this loss is well compensated by the carrying of heat to the second bank of fins 25, which takes heat from the injector post 23 and the coaxial recess 15 which receives the combustion chamber, which of course is the hottest part of the cylinder head. We thus divide the transfer of heat, the major bank of vertically arranged fins carrying the major portion of the heat principally from the exhaust passage and the second bank of fins, which are arranged horizontally, carry away the heat from the combustion chamber.

The fins 25 of the auxiliary bank, as shown in the various views, are of considerable extent. While their size would depend very largely upon the size of the engine, for the four horse-power engine illustrated I find it convenient to space the fins about ¼" from center to center and to have their depth appreciably over an inch. The fins of the major bank are up to 3¼" deep.

I find that the placing of a piece of sheet of metal such as 29 along the edge of the fins 25 of the second bank, as in Figure 2, will aid in the carrying away of heat from the fins 25, that is by use of this baffle 29 we can get the same amount of cooling with an appreciable saving in the amount of metal in the fins. The air of course passes from the exhaust side to the intake side, i. e. from right to left in Figure 1 and away from the observer in Fig. 2.

Having described my invention, what I claim is:

1. An engine head for a Diesel engine having therethrough an inlet passageway, an exhaust passageway, and recesses for the reception of an injector and a combustion chamber insert, means for carrying heat from the exhaust passageway, a plurality of closely spaced fins extending normal to the center line of the injector and insert openings, characterized by the provision of a recess extending at least half-way around the injector opening and spaced from it to provide a post, said recess leaving a solid bridge of metal between the fins and the injector recess whereby to carry heat from the neighborhood of the combustion chamber insert opening, thereby relieving the exhaust passageway heat carrying means.

2. A Diesel engine cylinder head substantially rectangular in plan, side elevation and front elevation, having recesses therein for an injector, a combustion chamber insert, an exhaust valve stem, an inlet valve stem, and an exhaust passage; said head having vertically extending fins transverse of the exhaust passage across the major portion of the top of the head and having horizontally positioned fins extending across a short side of the cylinder head from top to bottom of the head, said head including a solid metal bridge extending substantially from top to bottom of the head and integral with the horizontally positioned fins, and extending inwardly to the injector and combustion chamber insert recesses.

3. A substantially rectangular engine-head for a Diesel engine having therethrough an inlet passageway, an exhaust passageway and recesses for the reception of an injector and a combustion chamber insert; a plurality of vertical fins extending over the major portion of the top of the head from one side to the other and positioned very roughly at right angles to the exhaust passageway which extends from the center of the bottom face of the head to the rear of the head, a plurality of closely spaced horizontal fins extending at right angles to the vertical fins to relieve the vertical fins of a portion of the heat from the combustion chamber, said head having a recess extending at least half way around the injector opening and spaced from it to provide a post, said recess leaving a solid bridge of metal between the horizontal fins and the injector recess, whereby the vertical fins at the top of the head carry away the major portion of the heat from the exhaust passageway and the horizontal fins carry away the major portion of the heat from the combustion chamber insert.

4. The device of claim 1 in which the thickness of the solid bridge measured from the base of the fins to the injector recess is at least as great as the diameter of the injector recess.

5. The device of claim 1 in which the depth of the recess is greater than the depth of the injector recess, and the solid bridge extends from the level of the top of the injector recess to the bottom of the engine head.

6. A cylinder head for a Diesel engine employing a combustion chamber insert, comprising a member having an exhaust passageway therethru and having coaxial communicating recesses for reception of an injector and a combustion chamber insert characterized by the provision of cooling means encircling the exhaust passageway, a series of fins on the side of the communicating recesses distant from the exhaust passageway, and a solid bridge of metal extending from the base of the fins to the near margin of the communicating recesses and normal to the axis thereof and from one side of the head to the opposite side in a direction parallel to said axis, whereby the heat from the combustion chamber insert will in large measure pass thru the solid bridge to the fins thus relieving the exhaust passageway cooling means.

7. The device of claim 6 in which the cylinder head is recessed to form a semiannular well between the exhaust passageway and the communicating recesses to a depth roughly one-half of the depth of the cylinder head from top to bottom.

8. The device of claim 6 in which a vertical baffle is positioned adjacent the tips of the fins whereby to confine a current of air blown horizontally across the fins.

RICHARD H. SHEPPARD.

REFERENCES CITED

The following references are of record in the file of this patent:

UNITED STATES PATENTS

| Number | Name | Date |
|---|---|---|
| 2,104,257 | Heintz | Jan. 4, 1938 |
| 2,362,622 | Fischer | Nov. 14, 1944 |

FOREIGN PATENTS

| Number | Country | Date |
|---|---|---|
| 770,483 | France | Sept. 14, 1934 |